United States Patent
McEvoy et al.

(10) Patent No.: US 12,055,230 B2
(45) Date of Patent: *Aug. 6, 2024

(54) TRANSLATING CAVITY VALVE

(71) Applicant: Vault Pressure Control, LLC, Houston, TX (US)

(72) Inventors: Travis Kyle McEvoy, Houston, TX (US); Jeremy Choate, Houston, TX (US); Keith Adams, Katy, TX (US)

(73) Assignee: Vault Pressure Control LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/889,997

(22) Filed: Aug. 17, 2022

(65) Prior Publication Data

US 2022/0390019 A1    Dec. 8, 2022

Related U.S. Application Data (63) Continuation of application No. 16/871,773, filed on May 11, 2020, now Pat. No. 11,448,324.

(60) Provisional application No. 62/846,503, filed on May 10, 2019.

(51) Int. Cl.
| F16K 3/02 | (2006.01) |
| F16K 34/02 | (2006.01) |
| F16K 3/20 | (2006.01) |
| F16K 1/44 | (2006.01) |
| F16K 25/02 | (2006.01) |
| F16K 27/04 | (2006.01) |

(52) U.S. Cl.
CPC ............ *F16K 3/0209* (2013.01); *E21B 34/02* (2013.01); *F16K 3/0227* (2013.01); *F16K 3/207* (2013.01); *F16K 1/443* (2013.01); *F16K 25/02* (2013.01); *F16K 27/044* (2013.01)

(58) Field of Classification Search
CPC .... F16K 3/0209; F16K 3/0227; F16K 3/0236; F16K 3/20; F16K 3/207; F16K 25/02; F16K 27/044; F16K 2200/401; F16K 3/24; F16K 3/243; F16K 3/26; F16K 3/262; E21B 34/02; E21B 34/025
See application file for complete search history.

(56) References Cited

U.S. PATENT DOCUMENTS

| 2,194,261 A | * | 3/1940 | Allen ........................ F16K 3/12 |
| | | | 251/328 |
| 2,238,357 A | * | 4/1941 | Allen ........................ F16K 3/28 |
| | | | 251/266 |

(Continued)

*Primary Examiner* — David Colon-Morales
(74) *Attorney, Agent, or Firm* — Morgan, Lewis & Bockius LLP (57) ABSTRACT

A valve assembly includes a valve body and an opening extending through the valve body along a longitudinal axis. The valve assembly also includes a valve member arranged within the opening, the valve member being movable, along the longitudinal axis, between an open position and a closed position. The valve assembly includes an upper seal positioned to seal against at least a first portion of the valve body. The valve assembly includes a lower seal positioned to seal against at least a second portion of the valve body, wherein both the upper seal and the lower seal travel with the valve member as the valve member moves between the open position and a closed position.

10 Claims, 6 Drawing Sheets

(56) References Cited

U.S. PATENT DOCUMENTS

| | | | | |
|---|---|---|---|---|
| 2,299,124 A * | 10/1942 | Boynton | F16K 3/20 | 251/248 |
| 2,331,557 A * | 10/1943 | Lorehn | F16K 3/24 | 251/266 |
| 2,552,991 A * | 5/1951 | McWhorter | F16K 3/18 | 251/266 |
| 2,911,186 A * | 11/1959 | Knox | F16K 3/22 | 251/282 |
| 2,986,367 A * | 5/1961 | Le Rouax | F16K 39/04 | 251/327 |
| 3,002,525 A * | 10/1961 | Grove | F16K 3/0227 | 251/327 |
| 3,047,266 A * | 7/1962 | Ver Nooy | F16K 3/0227 | 251/327 |
| 3,089,678 A * | 5/1963 | Grove | F16K 3/0227 | 277/455 |
| 3,109,624 A * | 11/1963 | Edwarde | F16K 27/044 | 251/367 |
| 3,172,193 A * | 3/1965 | Grove | F16K 27/044 | 29/890.128 |
| 3,172,638 A * | 3/1965 | Grove | F16K 27/044 | 251/329 |
| 3,295,546 A * | 1/1967 | Carlton | F16K 3/0227 | 251/327 |
| 3,406,705 A * | 10/1968 | Meyer | F16K 3/243 | 251/325 |
| 3,426,799 A * | 2/1969 | Kintner | F16K 3/243 | 137/625.48 |
| 3,504,886 A * | 4/1970 | Hnlslander | F16K 3/0227 | 251/328 |
| 3,508,573 A * | 4/1970 | Smith | F16K 5/025 | 251/315.08 |
| 3,575,377 A * | 4/1971 | Carlton | F16K 3/188 | 251/327 |
| 3,575,431 A * | 4/1971 | Bryant | F16K 3/0227 | 251/327 |
| 3,682,200 A * | 8/1972 | Deve | F16K 3/262 | 251/309 |
| 3,780,982 A * | 12/1973 | Kemp | F16K 3/0209 | 251/210 |
| 3,889,925 A * | 6/1975 | Brooks | F16K 3/316 | 251/327 |
| 4,177,833 A * | 12/1979 | Morrison | F16K 5/0673 | 137/625.12 |
| 4,440,381 A * | 4/1984 | Tipton, Jr. | F16K 27/044 | 251/327 |
| 4,541,608 A * | 9/1985 | Forester | F16K 31/508 | 251/266 |
| 4,577,834 A * | 3/1986 | Oliver | F16K 3/0236 | 251/327 |
| 4,625,942 A * | 12/1986 | Nelson | F16K 3/0227 | 251/327 |
| 4,645,179 A * | 2/1987 | Ali | F16K 3/0227 | 251/327 |
| 4,913,400 A * | 4/1990 | Tiefenthaler | F16K 3/188 | 251/195 |
| 5,101,861 A * | 4/1992 | Deville | F16K 39/04 | 251/197 |
| 5,377,955 A * | 1/1995 | Baker | F16K 3/0263 | 251/327 |
| 5,415,378 A * | 5/1995 | Craven | E21B 34/02 | 251/329 |
| 6,401,747 B1 * | 6/2002 | Cain | F16K 31/508 | 251/266 |
| 6,454,015 B1 * | 9/2002 | Armstrong | E21B 29/04 | 166/85.4 |
| 6,631,880 B2 * | 10/2003 | Kandel | F16K 3/262 | 251/63 |
| 6,688,324 B2 * | 2/2004 | Hoang | E21B 43/16 | 251/327 |
| 7,017,886 B1 * | 3/2006 | Ngene-Igwe | F16K 3/0227 | 251/326 |
| 7,255,329 B1 * | 8/2007 | Sedens | F16K 3/314 | 251/327 |
| 8,403,296 B2 * | 3/2013 | Phillips | F16K 3/0227 | 251/328 |
| 8,499,783 B2 * | 8/2013 | Woodward | F16K 3/0227 | 251/327 |
| 8,567,759 B2 * | 10/2013 | Gharaibah | F16K 3/0209 | 251/207 |
| 8,672,295 B2 * | 3/2014 | Dhawan | F16K 3/20 | 251/328 |
| 8,690,124 B2 * | 4/2014 | Parks | F16K 3/02 | 251/327 |
| 8,695,637 B2 * | 4/2014 | McBride | F16K 39/04 | 251/193 |
| 8,939,173 B2 * | 1/2015 | Yahr | F16K 11/065 | 251/266 |
| 9,091,351 B2 * | 7/2015 | DeOcampo | F16K 37/0041 | |
| 9,206,910 B2 * | 12/2015 | Kahn | F16K 25/005 | |
| 9,222,583 B2 * | 12/2015 | Hoang | F16K 31/047 | |
| 9,395,002 B2 * | 7/2016 | McEvoy | F16K 39/04 | |
| 9,518,672 B2 * | 12/2016 | Martino | F16K 17/38 | |
| 9,541,104 B2 * | 1/2017 | McEvoy | F16K 31/1226 | |
| 9,850,740 B2 * | 12/2017 | Atencio | F16K 3/207 | |
| 9,970,553 B2 * | 5/2018 | Hawa | F16K 39/04 | |
| 10,077,844 B2 * | 9/2018 | Parks, Jr. | F16K 3/0227 | |
| 10,107,413 B2 * | 10/2018 | Cheng | F16K 3/0254 | |
| 10,400,899 B2 * | 9/2019 | Jackson | F16K 3/246 | |
| 10,519,739 B2 * | 12/2019 | Haverstad | E21B 33/062 | |
| 10,683,941 B2 * | 6/2020 | Lah | E21B 34/00 | |
| 11,448,324 B2 * | 9/2022 | McEvoy | F16K 3/0209 | |
| 2011/0240156 A1 * | 10/2011 | Azibi | F16K 3/0227 | 137/628 |
| 2014/0000907 A1 * | 1/2014 | Olvera | F16K 43/008 | 166/97.1 |
| 2014/0007966 A1 * | 1/2014 | McBride | F16K 39/04 | 251/327 |
| 2015/0267819 A1 * | 9/2015 | Duong | F16K 3/0236 | 251/328 |
| 2015/0276088 A1 * | 10/2015 | Rutar | F16K 3/24 | 137/625.69 |
| 2017/0130577 A1 * | 5/2017 | Cheng | F16K 37/0033 | |
| 2021/0025505 A1 * | 1/2021 | Vijay | F16K 3/316 | |

* cited by examiner

TRANSLATING CAVITY VALVE

CROSS REFERENCE TO RELATED APPLICATIONS

This application is a Continuation of U.S. application Ser. No. 16/871,773 filed May 11, 2020, which claims priority to and the benefit of U.S. Provisional Application Ser. No. 62/846,503 filed May 10, 2019 titled "TRANSLATING CAVITY VALVE," the full disclosure of which is hereby incorporated herein by reference in its entirety for all purposes.

BACKGROUND

1. Field of Disclosure

This disclosure relates in general to oil and gas tools, and in particular, to valves for controlling fluid flow.

2. Description of the Prior Art

In oil and gas production, valves may be used to regulate the flow of fluids through one or more wellbore tubulars. In certain applications, the fluid may include particulates, such as proppant in hydraulic fracturing operations. As the valves are cycled, a valve cavity may change in volume, providing additional area that may be infiltrated and filled with particulates, which may make future operation of the valve challenging. Furthermore, various sealing surfaces and/or seals may be exposed to the particulates, which could damage the seals and lead to leaks.

SUMMARY

Applicant recognized the problems noted above herein and conceived and developed embodiments of systems and methods, according to the present disclosure, for valves and valve assemblies.

In an embodiment, a valve assembly includes a valve body and an opening extending through the valve body along a longitudinal axis. The valve assembly also includes a valve member arranged within the opening, the valve member being movable, along the longitudinal axis, between an open position and a closed position. The valve assembly includes an upper seal positioned within a top seal orifice formed in the valve member, the upper seal positioned to seal against at least a first portion of the valve body. The valve assembly includes a lower seal positioned within a bottom seal orifice formed in the valve member, the lower seal positioned to seal against at least a second portion of the valve body, wherein both the upper seal and the lower seal travel with the valve member as the valve member moves between the open position and a closed position, the upper seal and a lower seal defining a cavity that maintains a substantially constant value throughout movement of the valve member.

In an embodiment, a valve assembly includes a valve body, the valve bodying having a flow bore extending along a flow bore axis. The valve assembly also includes an opening extending through the valve body along a longitudinal axis, the opening intersecting the flow bore. The valve assembly further includes a valve member positioned within the opening, the valve member being movable between an open position that aligns a flow passage with the flow bore and a closed position that aligns a block with the flow bore. The valve assembly includes a cavity defined by an upper seal of the valve member and a lower seal of the valve member, the cavity being translatable along the longitudinal axis in response to movement of the valve, the upper seal and lower seal each engaging the valve body to block fluid ingress into the opening.

In an embodiment, a method for forming a translating cavity valve includes providing a valve body having an opening that intersects a flow bore. The method also includes providing a valve member, the valve member having an upper seal and a lower seal arranged at opposing ends of the valve member, a flow passage being between the upper seal and the lower seal. The method further includes arranging the valve member within the opening. The method also includes engaging the valve body with the upper seal and the lower seal to from a cavity.

BRIEF DESCRIPTION OF THE DRAWINGS

The present technology will be better understood on reading the following detailed description of non-limiting embodiments thereof, and on examining the accompanying drawings, in which.

DETAILED DESCRIPTION

The foregoing aspects, features and advantages of the present technology will be further appreciated when considered with reference to the following description of preferred embodiments and accompanying drawings, wherein like reference numerals represent like elements. In describing the preferred embodiments of the technology illustrated in the appended drawings, specific terminology will be used for the sake of clarity. The present technology, however, is not intended to be limited to the specific terms used, and it is to be understood that each specific term includes equivalents that operate in a similar manner to accomplish a similar purpose.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments," or "other embodiments" of the present disclosure are not intended to be interpreted as excluding the existence of additional embodiments that also incorporate the recited features. Furthermore, reference to terms such as "above," "below," "upper", "lower", "side", "front," "back," or other terms regarding orientation are made with reference to the illustrated embodiments and are not intended to be limiting or exclude other orientations. Moreover, like reference numerals may be used for like items throughout the specification, however, such usage is for convenience and is not intended to limit the scope of the present disclosure.

Embodiments of the present disclosure include a valve, such as a gate valve, with a significantly reduced cavity. Moreover, the cavity remains constant throughout the travel of the gate. Additionally, the valve is capable of having a double barrier for increased safety and longevity. The sealing mechanism for the valve is relocated to the valve gate, and travels with the gate throughout the stroke of the gate. The resulting cavity therefore translates with the gate relative to the valve body. By decreasing the valve cavity, there is less ingress of material into the cavity. Ingress often results in problems for the valve operation, for example in fracturing operations. With the reduced cavity volume, fewer consumables like grease are needed, saving costs. Cost reduction is also provided by a reduction in ingress of materials, along with the reduced cost of consumables. Furthermore, in various embodiments, valves may be configured with reduced valve block size for large bore valves.

Embodiments are directed toward valves, which may be referred to as translating cavity valves or valve assemblies that include a cavity that remains substantially constant throughout a stroke of the valves. As a result, changes in cavity volume are eliminated or reduced to improve operation of the valve. In various embodiments, the valve further includes seals arranged on a valve member, which may be a gate in illustrated embodiments, which also translate along with movement of the valve gate along an axis. The seals may be positioned such that voids in the valve are substantially isolated from the valve working fluid, which may include particulates, which may cause damage to the valve, such as to the seals or sealing surfaces. Embodiments may also include a bypass that extends longitudinally through the valve member, for example perpendicular to a valve opening, to equalize pressure across the valve and enable movement between an open position and a closed position. It should be appreciated that, in various embodiments, the valve may be configured to operate without stem packing and/or using the stem packing as a backup or redundancy. Furthermore, in various embodiments, the valve may be configured to include one or more ports for leak detection between sealing assemblies within the valve.

Figure 1:
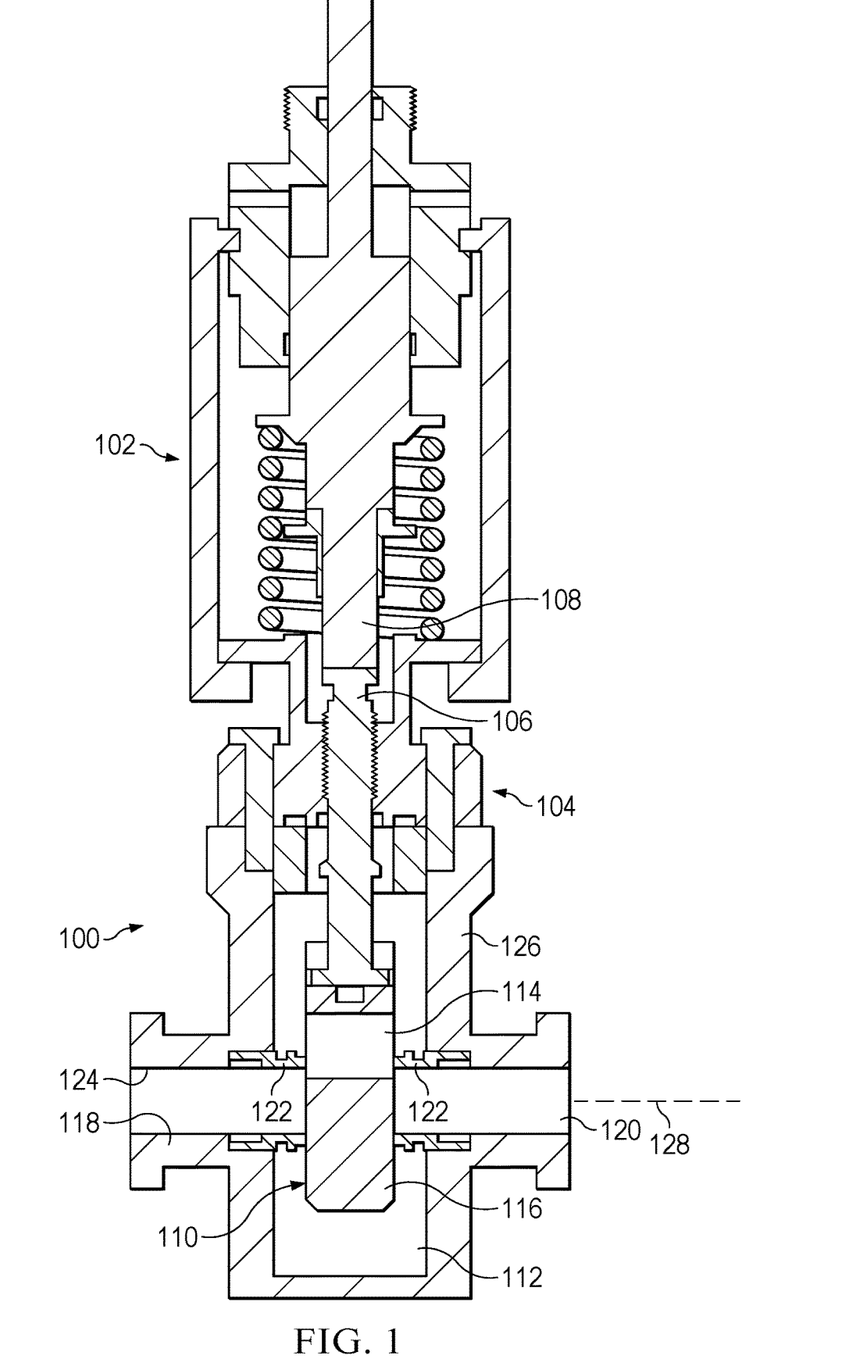
FIG. 1 is a schematic cross-sectional view of an embodiment of a valve assembly having an actuator, in accordance with embodiments of the present disclosure.

FIG. 1 is a cross-sectional side elevation view of an embodiment of a valve assembly 100 that includes an actuator 102 coupled to a bonnet 104. It should be appreciated that while the illustrated actuator 102 is an automated or controlled actuator, that manual operators may also be utilized within the scope of the present disclosure. The illustrated actuator 102 is coupled to a valve stem 106, via a connector 108 that extends through a central bore and couples to a valve member 110 arranged within a chamber 112. The illustrated valve member 110 includes a passage 114 and a block 116. As shown, fluid (e.g., gas, liquid, solid, or a combination thereof) may enter the valve 100 through an inlet passage 118 and engage the valve member 110 en route to an outlet passage 120. In the illustrated embodiment, the valve member 110 is transitioning between an open position, in which the passage 114 is substantially aligned with the inlet passage 118 and the outlet passage 120, and a closed position, in which the block 116 is substantially aligned with the inlet passage 118 and the outlet passage 120. The illustrated valve member 110 may seal against valve seats 122.

In operation, a bore 124 extends through a valve body 126 along a valve body axis 128. The fluid is at a pressure and travels through the bore 124, for example, when the valve member 110 is positioned in an open position. In certain operations, such as fracturing operations, the fluid may include particulates, such as proppant, that may erode sections of the valve body 126, for example, along the bore 124. Additionally, the fluid may contain corrosive materials and be at a high pressure, which may further damage the valve body 126.

In certain embodiments, the fluid may leak or otherwise be directed into the chamber 112, where the particulates within the fluid may collect. This may result in a restriction to valve movement, which may undesirably hinder cycling of the valve. As a result, the valve may not fully open or fully close, which may lead to operational upsets.

Figure 2:
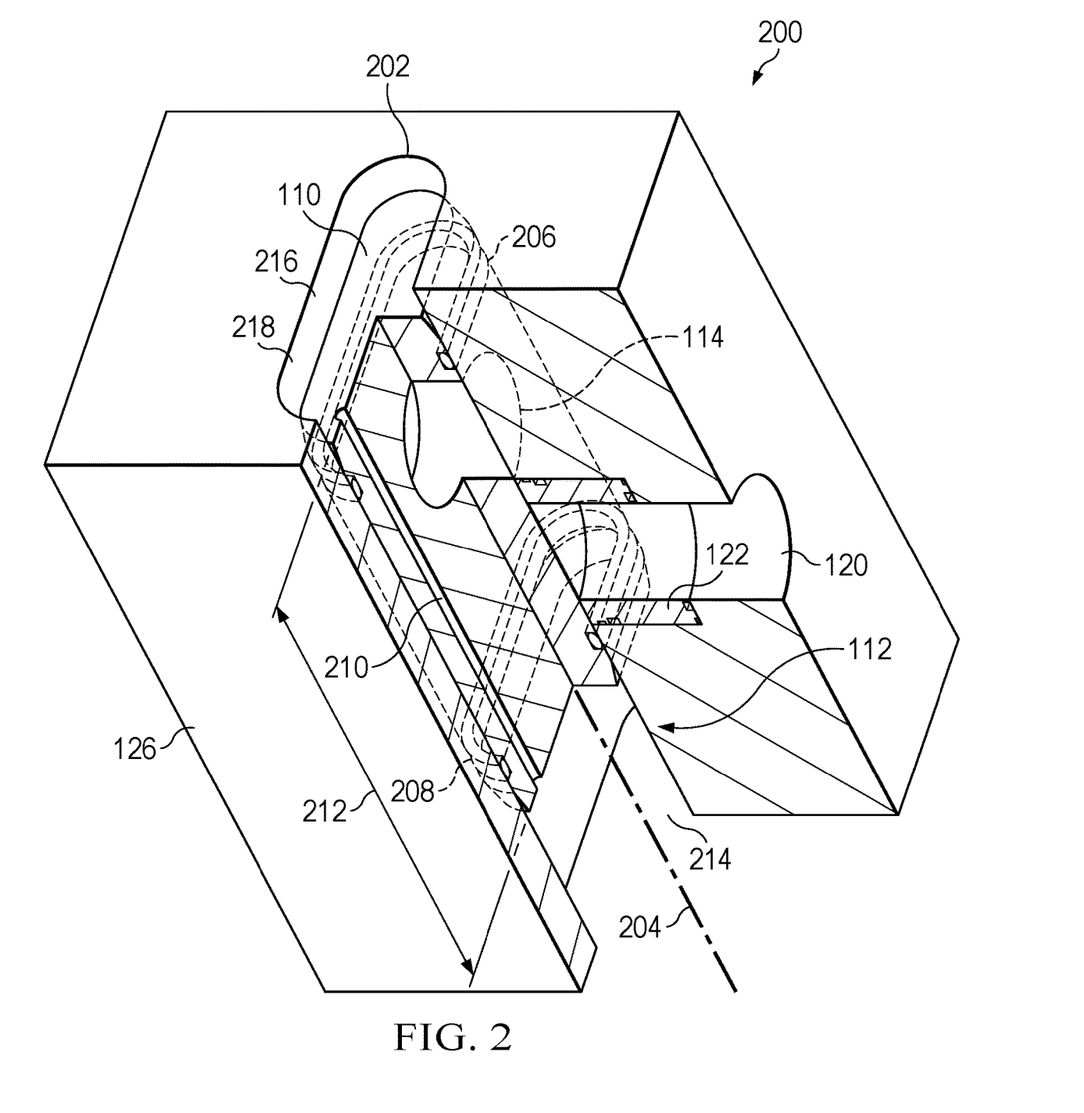
FIG. 2 is a sectional perspective view of an embodiment of a valve assembly, in accordance with embodiments of the present disclosure.

FIG. 2 is a sectional perspective view of a valve assembly 200, which may also be referred to as a translating cavity valve assembly. It should be appreciated that like reference numerals may be used between figures for clarity and conciseness, but such use should not be interpreted as limiting components between embodiments. The illustrated valve assembly 200 has several features that have been removed for clarity with the following discussion, such as the valve stem 106, actuator 102, and the like.

The illustrated valve assembly 200 includes the valve member 110 within an oblong opening 202 formed in the valve body 126. The illustrated valve member 110 is shown with hidden lines and in sectional view in order to illustrate various features that will be described herein. It should be appreciated that the shape of the valve member 110 and/or the opening 202 may be particularly selected based on expected operating conditions and that the illustration of oblong components is not intended to be limiting. The valve member 110, which is a gate in the illustrated embodiment, is positioned within the opening 202 is arranged to translate along a longitudinal axis 204 of the valve body 126 to transition a passage 114 between a closed position (illustrated) and an open position (not illustrated). It should be appreciated that other valve members may also be utilized with embodiments of the present disclosure. As noted above, in operation, fluid, which may be a gas, liquid, solid, or combination thereof, flows through the inlet 118 (not pictured) of the valve body 126 toward the valve member 110. When the flow passage 114 is aligned with the inlet 118, flow may continue through the valve assembly, as opposed to when the block 116 is aligned with the inlet 118, as shown in FIG. 2.

In the illustrated embodiment, the valve seats 122 extend into the opening 202 to engage at least a portion of the valve member 110. For example, as the valve member 110 translates along the axis 204 within the oblong opening 202, various portions of the valve member 110 may contact the respective valve seats 122. Traditional valves may include one or more seals arranged along the valve body and/or the valve seats. However, as will be described below, embodiments of the present disclosure include seals arranged along the valve member 110, which enables a substantially constant cavity that translates with the valve member 110.

In the illustrated embodiment, the valve member 110 includes a top seal orifice 206 and a bottom seal orifice 208. In various embodiments, seals are arranged within the respective orifices (not pictured) to bear against at least a portion of the valve body 126. The seals may be formed from any reasonable material, such as a metal, a composite, a polymer, or a combination thereof, to block ingress of fluid.

The top seal orifice 206 is arranged axially higher (along the axis 204) than the flow passage 114 and the bottom seal orifice 208 is arranged axially lower (along the axis 204) than the flow passage 114 and the outlet passage 120 of the valve body 126. As will be described below, in various embodiments movement of the valve member 110 between the open position and the closed position may also lead to movement of the top and bottom seal orifices 206, 208. During this movement, the top and bottom seal orifices 206, 208 may be positioned such that they do not cross or otherwise interact with the inlet 118 or outlet 120 of the valve body 126 and/or with the valve seats 122. As a result, the seals associated with the top and bottom seal orifices 206, 208 may seal against the valve body 126 throughout movement of the valve member 110. As will be described, such an arrangement may create a translating cavity, which may reduce the ingress of fluid and/or particulates into the chamber 112.

The illustrated valve member 110 further includes a bypass 210 extending through an axial length 212 of the valve member 110 to provide communication between a lower void 214 and an upper void 216. Such a bypass enables pressure equalization to facilitate axial translation of the valve member 110. It should be appreciated that each of the lower void 214 and the upper void 216 may be in fluid communication with the chamber 112.

The illustrated bypass 210 is shown positioned radially inward from an outer diameter 218 of the valve member 110. In other words, the bypass 210 does not interact with the orifices 206, 208. Furthermore, in the illustrated embodiment, the bypass 210 does not intersect the passage 114. However, it should be appreciated that, in various embodiments, the bypass 210 may intersect the passage 114.

Figure 3:
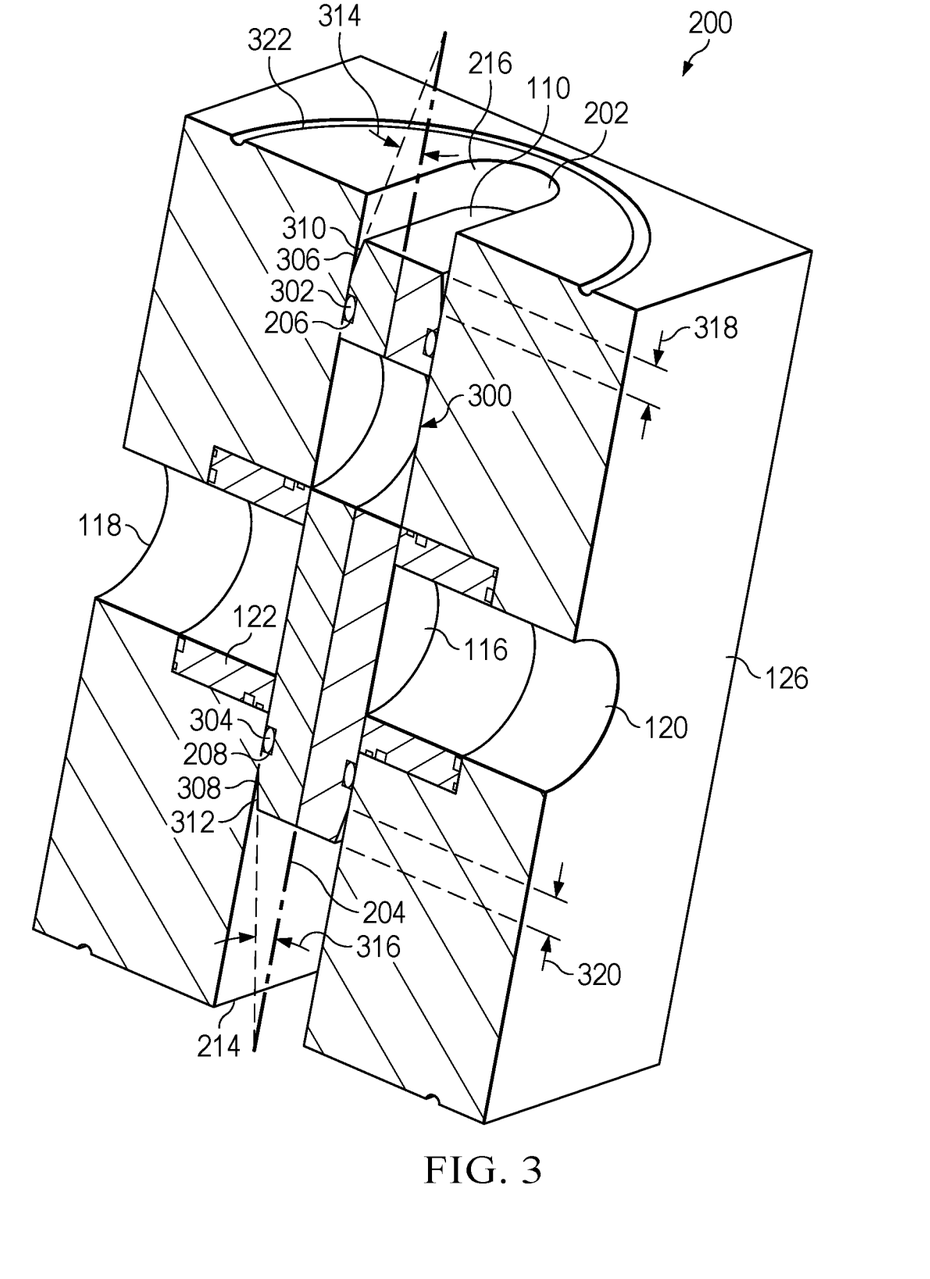
FIG. 3 is a cross-sectional perspective view of an embodiment of a valve assembly, in accordance with embodiments of the present disclosure.

FIG. 3 is cross-sectional perspective view of an embodiment of the valve assembly 200 illustrating the valve member 110 arranged within the opening 202. In the illustrated embodiment, the valve member 110 is shown in the closed position where the block 116 is aligned with the inlet passage 118 and the outlet passage 120. As a result, fluid flow through the valve is blocked. As noted above, the valve member 110 may seal or otherwise contact against the valve seats 122.

The illustrated embodiments includes a cavity 300, which may be defined as a volume between an upper seal 302 associated with the top seal orifice 206 and a bottom seal 304 associated with the bottom seal orifice 208. In other words, the cavity 300 is represented by a volume between sealing surfaces within the valve. In a traditional valve, the cavity may extend all the way up to a stem packing, and as a result, movement of the valve member within the opening would change a volume of the seal as the stem packing moves and/or as the valve member moves. In other words, the stem penetrates between the sealing elements. However, embodiments of the present disclosure eliminate this concern and enable a substantially constant cavity 300.

In the illustrated embodiment, the upper seal 302 and lower seal 304 are arranged to circumferentially surround the valve member 110. As a result, a seal is formed around an entirely of the valve member 110, for example, as the valve member 110 contacts the valve body 126. As noted above, the seals 302, 304 can be formed from any reasonable material and may extend outward from the respective orifices to engage the valve body 126. It should be appreciated that FIG. 3 may illustrate single seals at the top and bottom of the valve member 110, but it should be appreciated that multiple seals may be incorporated into various embodiments.

The valve member 110 further includes a top bevel 306 and a bottom bevel 308. The illustrated bevels 306, 308 are axially higher and axially lower, respectively, of the top and bottom seal orifices 206, 208. That is, the top bevel 306 is axially higher than the top seal orifice 206 and the bottom bevel 308 is axially lower than the bottom seal orifice 208. The illustrated bevels 306, 308 include respective slanted faces 310, 312 positioned at angles 314, 316. It should be appreciated that the angles 314, 316 may be different between the top bevel 306 and the bottom bevel 308. Furthermore, respective axial lengths 318, 320 of the bevels 306, 308 may also be different. However, in other embodiments, the bevels 306, 308 may be substantially similar. Furthermore, it should be appreciated that the bevels 306, 308 may not be present in other embodiments, or different shapes or sized bevels or cutouts may be present.

As shown in the embodiment illustrated in FIG. 3, the upper seal 302 contacts the valve body 126 and the lower seal 304 also contacts the valve body 126. The lower seal 126 is in contact axially lower than the valve seat 122. As a result, particulates may be blocked from flowing toward the lower void 214, which could build up and make operation of the valve difficult.

In various embodiments, a bonnet gasket seal (not pictured) may be positioned within a groove 322 formed in the valve body 126. This seal may be a secondary seal or backup seal when utilizing embodiments of the present disclosure because pressure is substantially contained with the seals 302, 304 defining the cavity. This backup sealing capability may provide various advantages with maintenance, operation, and repair, as described herein.

Figure 4A:
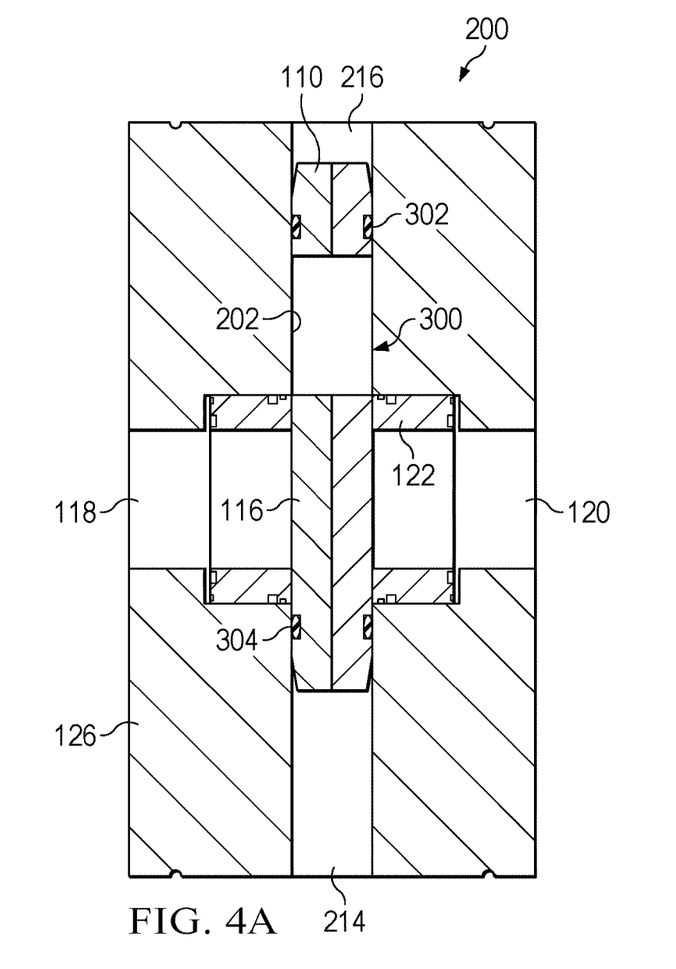
FIGS. 4A and 4B are cross-sectional side views of an embodiment of a valve assembly illustrating a translating cavity, in accordance with embodiments of the present disclosure.

FIGS. 4A and 4B are cross-sectional views of an embodiment of the valve assembly 200 where the valve member 110 is arranged within the opening 202. FIG. 4A illustrates the valve member 110 in the closed position where the block 116 is aligned with the inlet and outlet passages 118, 120. The cavity 300 is shown between the upper seal 302 and the lower seal 304. In the illustrated embodiment, both the upper seal 302 and the lower seal 304 engage the valve body 126. As previously noted, the lower seal 304 is axially lower than the valve seat 122, and in various embodiments, it arranged along the valve member 110 such that the lower seal 304 does not engage and/or pass the valve seat 122. In other words, the lower seal 304 may be positioned to remain within the lower void 214.

Figure 4B:
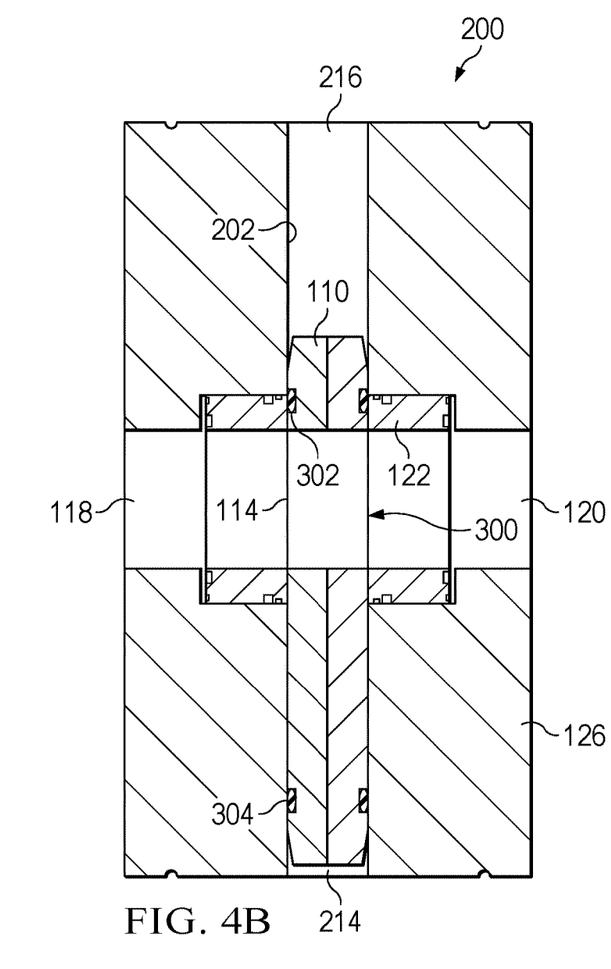

Movement of the valve member 110 to the open position will also drive movement of the cavity 300 as the valve member 110 axially translates within the opening 202. As a result, volume is not added or removed from the cavity 300 during movement of the valve member 110, as illustrated in FIG. 4B, where the valve member 110 is translated to the open position to align the passage 114 with the inlet and outlet passages 118, 120. In the illustrated embodiments, the seals 302, 304 maintain contact with the valve body 126, and in certain embodiments, may engage the valve seats 122. Accordingly, there may be reduced ingress of materials, such as particulates. Additionally, in various embodiments, because the upper and lower seals 302, 304 maintain the operating pressure, other pressures found outside the seals may be vented or the area may be cleaned without disconnecting the valve from service.

Figure 5:
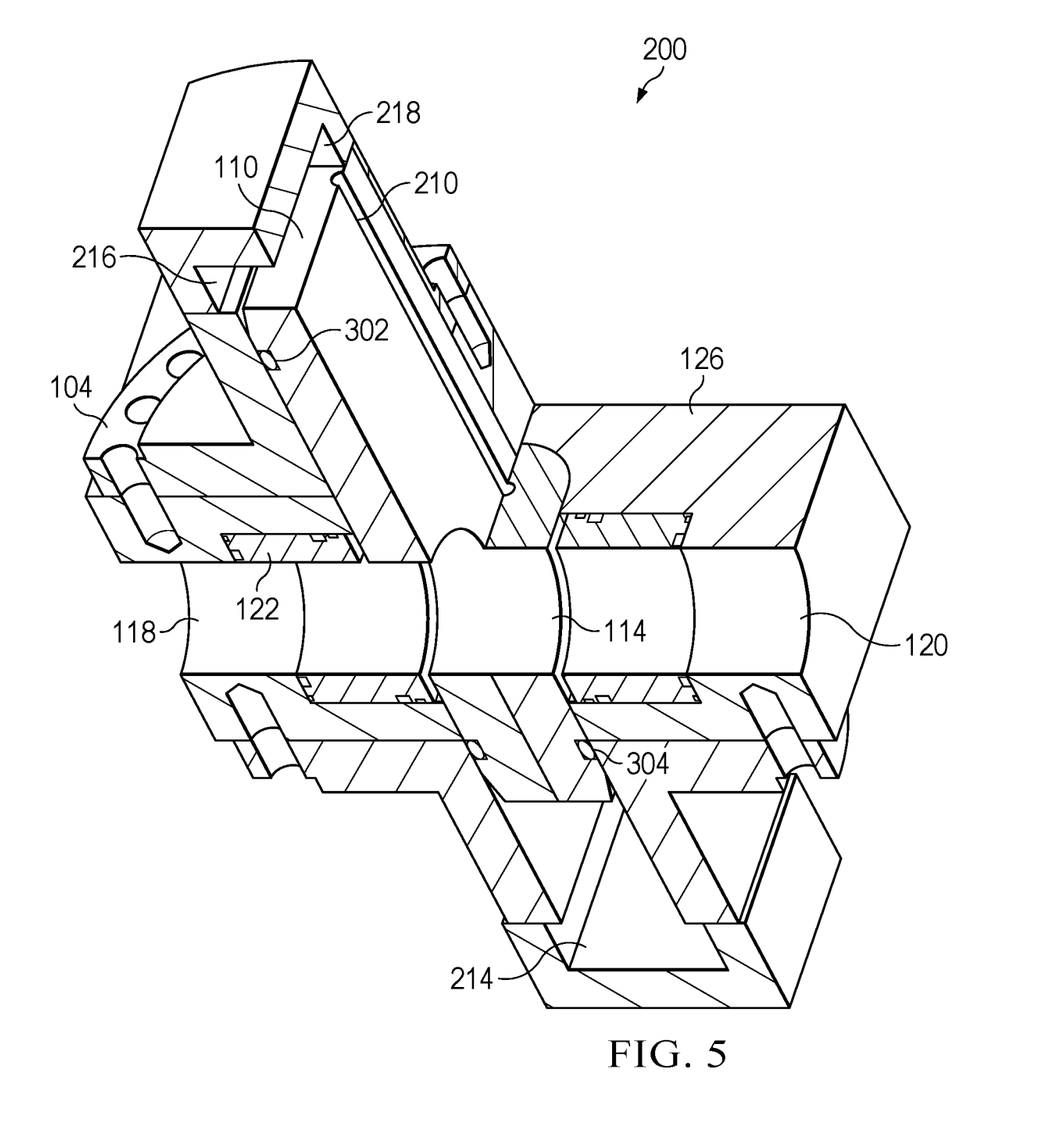
FIG. 5 is a sectional perspective view of an embodiment of a valve assembly, in accordance with embodiments of the present disclosure.

FIG. 5 is a perspective view of an embodiment of the valve assembly 200 illustrating the valve member 110 in the open position where the flow passage 114 is aligned with the inlet and outlet passages 118, 120. It should be appreciated that the configuration shown in FIG. 5 differs from the configuration in at least FIG. 2 because the flow passage 114 is axially lower than the block 116. As previously noted, the upper and lower seals 302, 304 seal against the valve body 126 in various embodiments. However, it should be appreciated that configurations, such as those shown in FIG. 5, may further enable sealing against the bonnet 104.

Further illustrated is the bypass 210 extending between the lower void 214 and the upper void 216. As described above, the bypass enables pressure equalization across the valve member 110 to facilitate axial movement between the open position and the closed position. As shown, the voids 214, 216 are in fluid communication with one another. The illustrated bypass 210 does not intersect the passage 114 and is arranged within the outer diameter 218 of the valve member 110. As a result, the bypass 210 does not break or otherwise affect the sealing of the upper and lower seals 302, 304.

Figure 6:
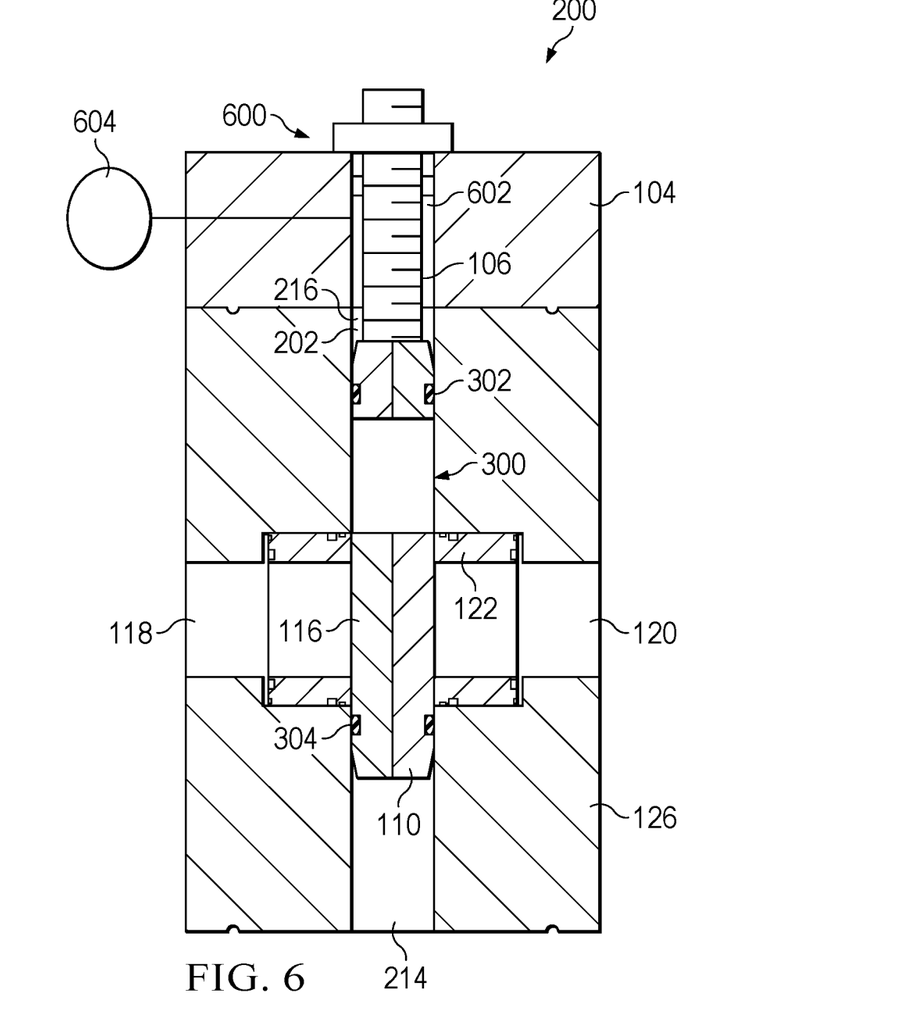
FIG. 6 is a cross-sectional side view of an embodiment of a valve assembly and seal integrity system, in accordance with embodiments of the present disclosure.

FIG. 6 is a cross-sectional side view of an embodiment of the valve assembly 200 that includes a seal integrity detection system 600. The illustrated embodiment includes the upper and lower seals 302, 304 of the valve member 110 engaging the valve body 126 to form the cavity 300. Further illustrated is the valve stem 106 extending through the bonnet 104. However, it should be appreciated that, in other embodiments, the valve stem 106 may extend through an extension of the valve body 126 and/or at least partially through an actuator body. The illustrated stem 106 includes stem packing 602 arranged within the bonnet 104. In various embodiments, the stem packing 602 may be removed as containment is provided by the upper seal 302 and the lower seal 304. However, in other embodiments, the stem packing 602 may be utilized as a secondary or redundant seal.

In the illustrated embodiment, a pressure transducer 604 is positioned to detect pressure between the upper seal 302 and the stem packing 602. If the pressure transducer 604 detects pressure above a threshold amount (e.g., an amount set by an operator), that reading may be indicative of damage to the upper seal 302 and/or the lower seal 304. It should be appreciated that damage to the lower seal 304 may still be recognized due to the bypass 210 (not pictured) extending through the valve member 110. Accordingly, the operating integrity of the seals 302, 304 may be evaluated throughout working conditions. The use of the redundant stem packing 602 may allow operations to continue, even if damage to the upper or lower seals 302, 304 is detected, and to thereafter provide maintenance operations later. Furthermore, if the upper and lower seals 302, 304 maintain sealing capability, the valve may be utilized in other jobs, thereby saving costs.

In certain embodiments, the seal integrity system 600 may include one or more alarms or indicators to provide a notification to operators. For example, the pressure transducer 604 may transmit a signal to a controller that receives and interprets the reading and correlates the data to a pressure. The pressure may be evaluated against a threshold amount, which may be particularly selected based on operating conditions, where a pressure that exceeds the threshold amount may trigger an alarm or notification. In this manner, seal integrity may be continuously monitored.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

The invention claimed is:

1. A valve assembly, comprising:
   a valve body comprising a flow bore extending along a flow bore axis and an opening extending through the valve body along a longitudinal axis that is substantially perpendicular to the flow bore axis;
   a valve member arranged within the opening, the valve member being movable, along the longitudinal axis, between an open position and a closed position;
   an upper seal positioned within a top seal orifice formed in the valve member, the upper seal positioned to seal against at least a first portion of the valve body; and
   a lower seal positioned within a bottom seal orifice formed in the valve member, the lower seal positioned to seal against at least a second portion of the valve body, wherein both the upper seal and the lower seal travel with the valve member as the valve member moves between the open position and the closed position, the upper seal and the lower seal defining a cavity that maintains a substantially constant volume throughout movement of the valve member; and
   a first valve seat and a second valve seat disposed adjacent to the flow bore and configured to engage the valve member.

2. The valve assembly of claim 1, wherein the lower seal has a range of travel that is axially lower than a vertical position of the first valve seat.

3. The valve assembly of claim 1, wherein the upper seal has a range of travel that is axially higher than a vertical position of the second valve seat.

4. The valve assembly of claim 1, wherein the valve member is oblong shaped.

5. A valve assembly, comprising:
   a valve body comprising a flow bore extending along a flow bore axis and an opening extending through the valve body along a longitudinal axis that is substantially perpendicular to the flow bore;
   a valve member positioned within the opening, the valve member being movable between an open position that aligns a flow passage with the flow bore and a closed position that aligns a block with the flow bore;
   a cavity defined by an upper seal of the valve member and a lower seal of the valve member, the cavity being translatable along the longitudinal axis in response to movement of the valve, the upper seal and the lower seal each engaging the valve body to block fluid ingress into the opening; and
   a first valve seat and a second valve seat disposed adjacent to the flow bore and configured to engage the valve member.

6. The valve assembly of claim 5, wherein a cavity volume is substantially constant throughout movement of the valve member.

7. The valve assembly of claim 5, wherein the upper seal is arranged within a top seal orifice formed in the valve member and the lower seal is arranged within a bottom seal orifice formed in the valve member.

8. A method for forming a translating cavity valve, comprising:
   providing a valve body having an opening that intersects a flow bore;

providing a valve member, the valve member having an upper seal and a lower seal arranged at opposing ends of the valve member, a flow passage being between the upper seal and the lower seal;

arranging the valve member within the opening;

engaging the valve body with the upper seal and the lower seal to from a cavity; and arranging a first valve seat and a second valve seat such that said valve seats are adjacent to the flow bore and configured to engage the valve member.

9. The method of claim 8, further comprising:

forming a top seal orifice in the valve member, the top seal orifice receiving the upper seal; and forming a bottom seal orifice in the valve member, the bottom seal orifice receiving the lower seal.

10. The method of claim 8, wherein the cavity moves along with the valve member as the valve member moves between an open position and a closed position.

* * * * *